(12) United States Patent
Balasubramanian et al.

(10) Patent No.: US 11,336,355 B2
(45) Date of Patent: May 17, 2022

(54) CQI-BASED DOWNLINK BUFFER MANAGEMENT

(71) Applicant: QUALCOMM Incorporated, San Diego, CA (US)

(72) Inventors: Ravi Balasubramanian, La Jolla, CA (US); Praveen Adusumilli, San Diego, CA (US); Ammar Kitabi, San Diego, CA (US); Arnaud Meylan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 19 days.

(21) Appl. No.: 16/674,724

(22) Filed: Nov. 5, 2019

(65) Prior Publication Data
US 2021/0135727 A1     May 6, 2021

(51) Int. Cl.
| | |
|---|---|
| *H04B 7/06* | (2006.01) |
| *H04W 24/10* | (2009.01) |
| *H04W 28/02* | (2009.01) |
| *H04W 28/06* | (2009.01) |
| *H04W 72/08* | (2009.01) |
| *H04W 88/06* | (2009.01) |

(52) U.S. Cl.
CPC .......... *H04B 7/0632* (2013.01); *H04W 24/10* (2013.01); *H04W 28/0278* (2013.01); *H04W 28/06* (2013.01); *H04W 72/085* (2013.01); *H04W 88/06* (2013.01)

(58) Field of Classification Search
CPC ... H04W 28/04; H04W 72/04; H04W 72/042; H04W 88/08; H04W 72/0007; H04L 5/0007

USPC ......................................................... 370/329
See application file for complete search history.

(56) References Cited

U.S. PATENT DOCUMENTS

| | | | |
|---|---|---|---|
| 7,839,813 B2 * | 11/2010 | Kim ...................... | H04L 1/1848 370/322 |
| 9,215,725 B2 | 12/2015 | Behnamfar et al. | |
| (Continued) | | | |

FOREIGN PATENT DOCUMENTS

| | | | | |
|---|---|---|---|---|
| WO | WO 2013/151922 A1 * | 10/2013 | ............ | H04W 36/00 |
| WO | 2013169834 A1 | 11/2013 | | |
| (Continued) | | | | |

OTHER PUBLICATIONS

International Search Report and Written Opinion—PCT/US2020/055587—ISA/EPO—dated Feb. 4, 2021.

*Primary Examiner* — Pankaj Kumar
*Assistant Examiner* — Sanjay K Dewan
(74) *Attorney, Agent, or Firm* — Dalei Dong

(57) ABSTRACT

Certain aspects of the present disclosure provide techniques for channel quality indicator (CQI)-based downlink buffer management as well as mitigating throughput loss in dual connectivity with multi-SIM. A method that may be performed by a user equipment (UE) includes communicating with a first network on a first channel using a first technology, determining whether a tune-away associated with the first technology will occur, and outputting, for transmission to the first network on a second channel using a second technology, a channel quality indicator (CQI) report corresponding to the second channel if the tune-away will occur, wherein the CQI report indicates a lower CQI for the second channel than a current CQI for the second channel.

30 Claims, 7 Drawing Sheets

(56) References Cited

U.S. PATENT DOCUMENTS

| | | | |
|---|---|---|---|
| 9,544,042 B2 | 1/2017 | Li et al. | |
| 9,578,584 B1* | 2/2017 | Oroskar | H04W 52/0216 |
| 9,973,942 B2 | 5/2018 | Su et al. | |
| 10,075,969 B2* | 9/2018 | Bertrand | H04W 72/1231 |
| 10,085,279 B1* | 9/2018 | Mehta | H04W 36/0088 |
| 2004/0049612 A1* | 3/2004 | Boyd | H04L 49/9063 |
| | | | 710/52 |
| 2011/0235634 A1* | 9/2011 | Fukuda | H04L 47/34 |
| | | | 370/389 |
| 2011/0317635 A1 | 12/2011 | Swaminathan | |
| 2015/0092708 A1* | 4/2015 | Su | H04W 76/16 |
| | | | 370/329 |
| 2015/0257200 A1* | 9/2015 | Su | H04W 76/28 |
| | | | 455/552.1 |
| 2016/0021581 A1* | 1/2016 | Deenoo | H04W 36/0055 |
| | | | 370/331 |
| 2016/0044639 A1* | 2/2016 | Yi | H04L 47/624 |
| | | | 370/329 |
| 2016/0157265 A1 | 6/2016 | Lee et al. | |
| 2016/0323860 A1 | 11/2016 | Matin et al. | |
| 2018/0352477 A1* | 12/2018 | Singh | H04W 72/0433 |
| 2018/0368166 A1* | 12/2018 | Jheng | H04W 72/1284 |
| 2020/0037204 A1* | 1/2020 | Gurumoorthy | H04L 69/04 |

FOREIGN PATENT DOCUMENTS

| | | |
|---|---|---|
| WO | 2016200651 A1 | 12/2016 |
| WO | 2017019188 A1 | 2/2017 |

\* cited by examiner

600

| CQI index | Modulation | TBS (Bytes) | % TB Reduction compared to CQI=15 |
|---|---|---|---|
| 1 | QPSK | NA | NA |
| 2 | QPSK | 6792 | 0.949759 |
| 3 | QPSK | 15885 | 0.882498 |
| 4 | 16QAM | 26647 | 0.802891 |
| 5 | 16QAM | 34847 | 0.742235 |
| 6 | 16QAM | 43047 | 0.681579 |
| 7 | 64QAM | 49159 | 0.636368 |
| 8 | 64QAM | 59448 | 0.56026 |
| 9 | 64QAM | 69677 | 0.484596 |
| 10 | 64QAM | 81975 | 0.393627 |
| 11 | 64QAM | 92221 | 0.317837 |
| 12 | 256QAM | 100413 | 0.25724 |
| 13 | 256QAM | 112668 | 0.166589 |
| 17 | 256QAM | 124947 | 0.075761 |
| 15 | 256QAM | 135189 | 0 |

FIG. 6

CQI-BASED DOWNLINK BUFFER MANAGEMENT

BACKGROUND

Field of the Disclosure

Aspects of the present disclosure relate to wireless communications, and more particularly, to techniques for channel quality indicator (CQI)-based downlink buffer management as well as mitigating throughput loss in dual connectivity with multi-SIM.

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved channel quality indicator (CQI)-based downlink buffer management as well as mitigating throughput loss in dual connectivity with multi-SIM.

Certain aspects provide a method for wireless communication by a user equipment (UE). The method generally includes communicating with a first network on a first channel using a first technology, determining whether a tune-away associated with the first technology will occur, and outputting, for transmission to the first network on a second channel using a second technology, a channel quality indicator (CQI) report corresponding to the second channel if the tune-away will occur, wherein the CQI report indicates a lower CQI for the second channel than a current CQI for the second channel.

Certain aspects provide an apparatus for wireless communication by a user equipment (UE). The apparatus generally includes a processing system configured to: communicate with a first network on a first channel using a first technology and determine whether a tune-away associated with the first technology will occur. The apparatus also generally includes an interface configured to output, for transmission to the first network on a second channel using a second technology, a channel quality indicator (CQI) report corresponding to the second channel if the tune-away will occur, wherein the CQI report indicates a lower CQI for the second channel than a current CQI for the second channel. The apparatus also generally includes a memory coupled with the at least one processor.

Certain aspects provide an apparatus for wireless communication by a user equipment (UE). The apparatus generally includes means for communicating with a first network on a first channel using a first technology, means for determining whether a tune-away associated with the first technology will occur, and outputting, for transmission to the first network on a second channel using a second technology, a channel quality indicator (CQI) report corresponding to the second channel if the tune-away will occur, wherein the CQI report indicates a lower CQI for the second channel than a current CQI for the second channel.

Certain aspects provide a non-transitory computer-readable medium for wireless communication by a user equipment (UE). The apparatus generally includes instructions executable by an apparatus to: communicate with a first network on a first channel using a first technology, determine whether a tune-away associated with the first technology will occur, and output, for transmission to the first network on a second channel using a second technology, a channel quality indicator (CQI) report corresponding to the second channel if the tune-away will occur, wherein the CQI report indicates a lower CQI for the second channel than a current CQI for the second channel.

Certain aspects provide a user equipment for wireless communication. The user equipment generally includes a processing system configured to communicate with a first network on a first channel using a first technology and determine whether a tune-away associated with the first technology will occur. The user equipment also generally includes a transmitter configured transmit, to the first network on a second channel using a second technology, a channel quality indicator (CQI) report corresponding to the second channel if the tune-away will occur, wherein the CQI report indicates a lower CQI for the second channel than a current CQI for the second channel.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

FIG. 6 illustrates a table showing a correlation between channel quality indicator indexes and transport block sizes, in accordance with certain aspects of the present disclosure.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Aspects of the present disclosure provide apparatus, methods, processing systems, and computer readable mediums for channel quality indicator (CQI)-based downlink buffer management as well as mitigating throughput loss in dual connectivity with multi-SIM. For example, in some cases, techniques may involve transmitting a "fake" lower channel quality indicator (CQI) than a current CQI so as to result in a downlink buffer not being overloaded.

As noted, the following description provides examples of CQI-based downlink buffer management as well as mitigating throughput loss in dual connectivity with multi-SIM, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, a 5G NR RAT network may be deployed.

Figure 1:
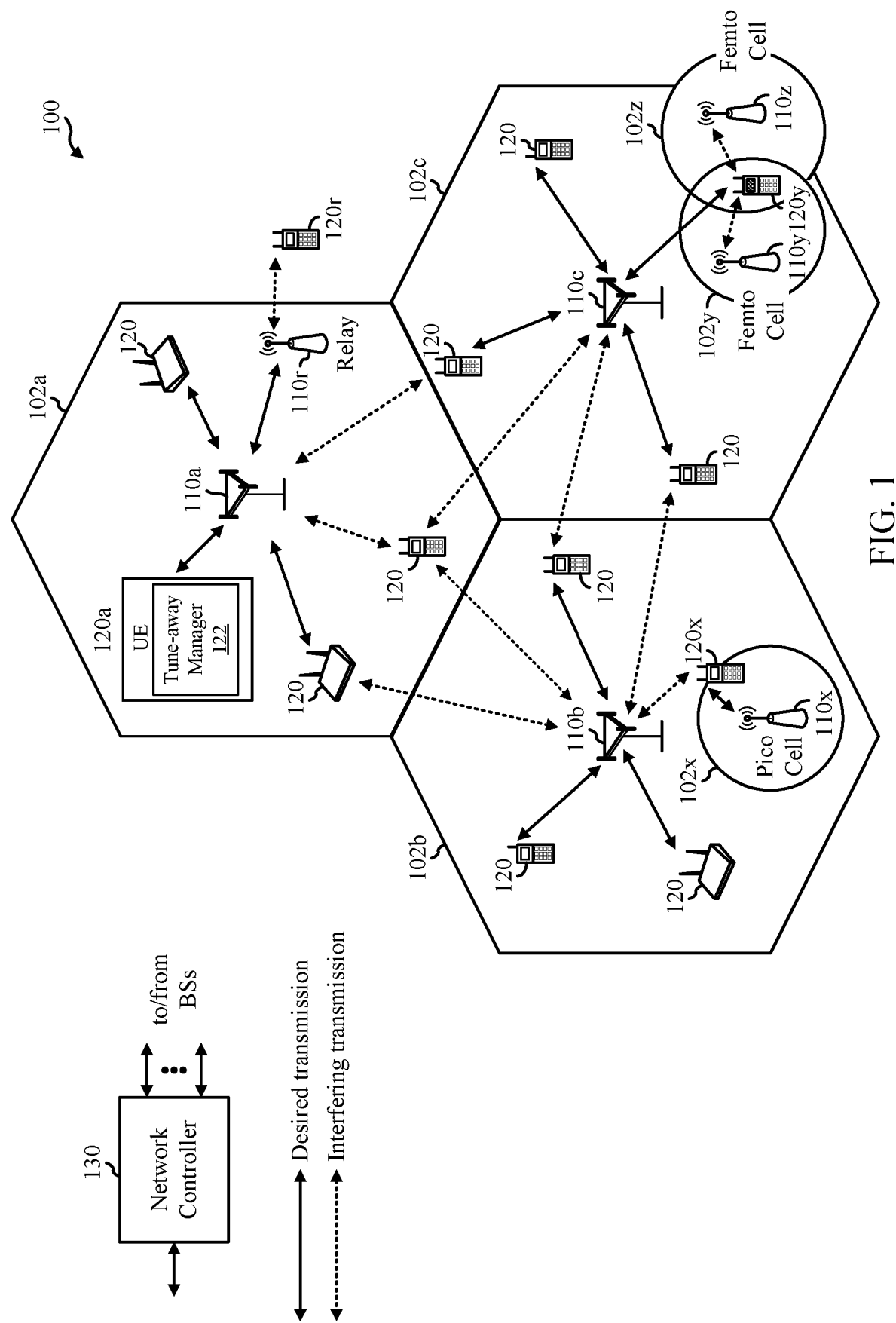
FIG. 1 is a block diagram conceptually illustrating an example telecommunications system, in accordance with certain aspects of the present disclosure.

FIG. 1 illustrates an example wireless communication network 100 in which aspects of the present disclosure may be performed. For example, the wireless communication network 100 may be an NR system (e.g., a 5G NR network).

As illustrated in FIG. 1, the wireless communication network 100 may include a number of base stations (BSs) 110*a-z* (each also individually referred to herein as BS 110 or collectively as BSs 110) and other network entities. A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110*a*, 110*b* and 110*c* may be macro BSs for the macro cells 102*a*, 102*b* and 102*c*, respectively. The BS 110*x* may be a pico BS for a pico cell 102*x*. The BSs 110*y* and 110*z* may be femto BSs for the femto cells 102*y* and 102*z*, respectively. A BS may support one or multiple cells. The BSs 110 communicate with user equipment (UEs) 120*a-y* (each also individually referred to herein as UE 120 or collectively as UEs 120) in the wireless communication network 100. The UEs 120 (e.g., 120*x*, 120*y*, etc.) may be dispersed throughout the wireless communication network 100, and each UE 120 may be stationary or mobile.

According to certain aspects, the BSs 110 and/or UEs 120 may be configured for CQI-based downlink buffer management as well as mitigating throughput loss in dual connectivity with multi-SIM, as explained below. For example, as shown in FIG. 1, the UE 120*a* includes a tune-away manager 122. The tune-away manager 122 may be configured, in some cases, to perform the operations illustrated in one or more of FIG. 5 as well as other operations described herein for channel quality indicator (CQI)-based downlink buffer management as well as mitigating throughput loss in dual connectivity with multi-SIM, in accordance with aspects of the present disclosure. For example, in some cases, the tune-away manager 122 may be configured to output, for transmission to the first network on a second channel using a second technology, a channel quality indicator (CQI)

report corresponding to the second channel if the tune-away will occur, wherein the CQI report indicates a lower CQI for the second channel than a current CQI for the second channel.

Wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices.

A network controller 130 may couple to a set of BSs 110 and provide coordination and control for these BSs 110. The network controller 130 may communicate with the BSs 110 via a backhaul. The BSs 110 may also communicate with one another (e.g., directly or indirectly) via wireless or wireline backhaul.

Figure 2:
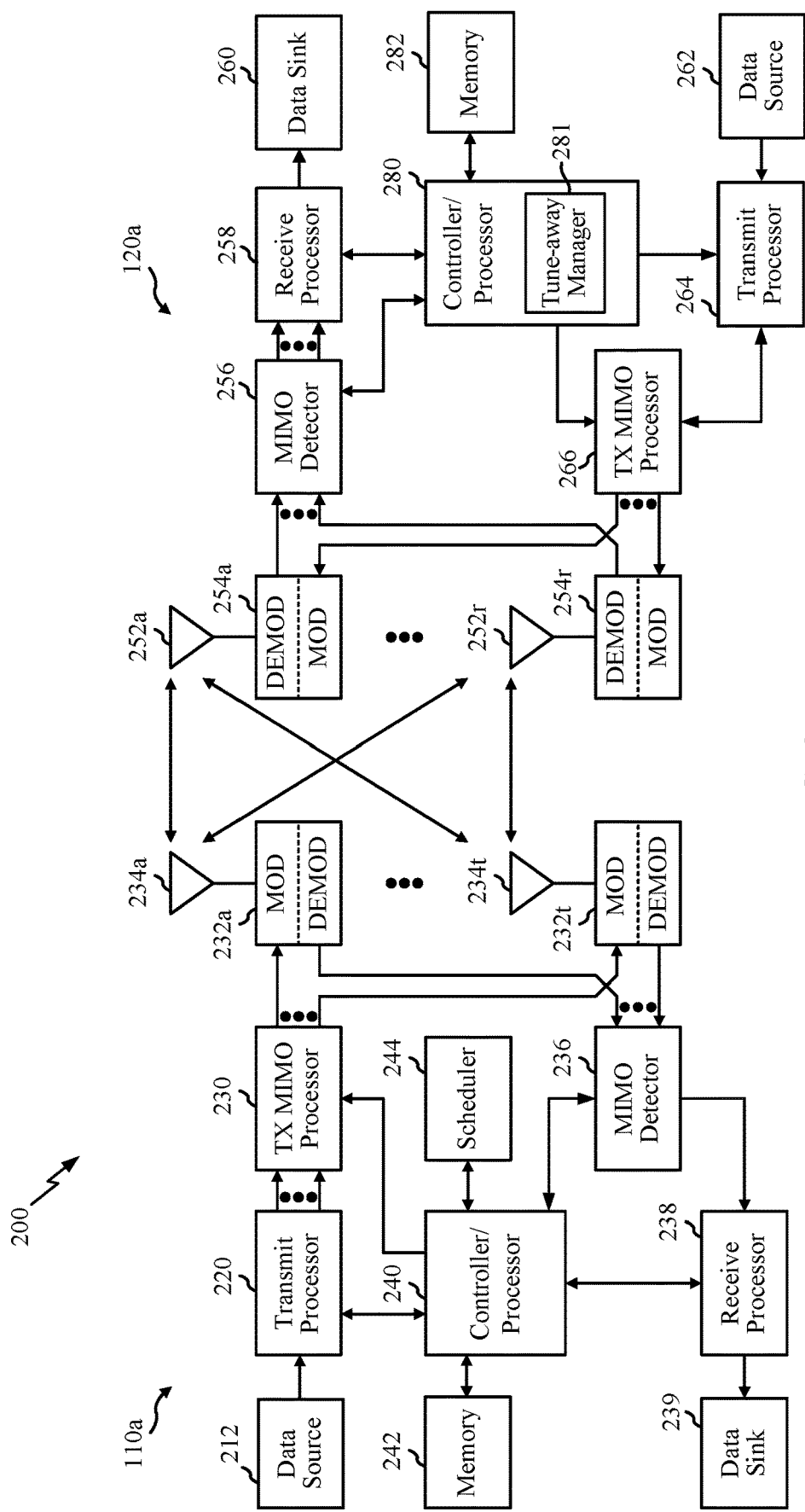
FIG. 2 is a block diagram conceptually illustrating a design of an example a base station (BS) and user equipment (UE), in accordance with certain aspects of the present disclosure.

FIG. 2 illustrates example components of BS 110a and UE 120a (e.g., in the wireless communication network 100 of FIG. 1), which may be used to implement aspects of the present disclosure.

At the BS 110a, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), and cell-specific reference signal (CRS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a-232t. Each modulator 232 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 232a-232t may be transmitted via the antennas 234a-234t, respectively.

At the UE 120a, the antennas 252a-252r may receive the downlink signals from the BS 110a and may provide received signals to the demodulators (DEMODs) in transceivers 254a-254r, respectively. Each demodulator 254 may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators 254a-254r, perform MIMO detection on the received symbols if applicable, and provide detected symbols. A receive processor 258 may process (e.g., demodulate, deinterleave, and decode) the detected symbols, provide decoded data for the UE 120a to a data sink 260, and provide decoded control information to a controller/processor 280.

On the uplink, at UE 120a, a transmit processor 264 may receive and process data (e.g., for the physical uplink shared channel (PUSCH)) from a data source 262 and control information (e.g., for the physical uplink control channel (PUCCH) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the demodulators in transceivers 254a-254r (e.g., for SC-FDM, etc.), and transmitted to the BS 110a. At the BS 110a, the uplink signals from the UE 120a may be received by the antennas 234, processed by the modulators 232, detected by a MIMO detector 236 if applicable, and further processed by a receive processor 238 to obtain decoded data and control information sent by the UE 120a. The receive processor 238 may provide the decoded data to a data sink 239 and the decoded control information to the controller/processor 240.

The memories 242 and 282 may store data and program codes for BS 110a and UE 120a, respectively. A scheduler 244 may schedule UEs for data transmission on the downlink and/or uplink.

The controller/processor 280 and/or other processors and modules at the UE 120a may perform or direct the execution of processes for the techniques described herein for CQI-based downlink buffer management as well as mitigating throughput loss in dual connectivity with multi-SIM. For example, as shown in FIG. 2, the controller/processor 280 of the UE 120a includes an tune-away manager 281 that may be configured for performing the operations illustrated in one or more of FIG. 5 as well as other operations described herein for channel quality indicator (CQI)-based downlink buffer management as well as mitigating throughput loss in dual connectivity with multi-SIM, according to aspects described herein. For example, in some cases, the tune-away manager 281 may be configured to communicate with a first network on a first channel using a first technology, determine whether a tune-away associated with the first technology will occur, and output, for transmission to the first network on a second channel using a second technology, a channel quality indicator (CQI) report corresponding to the second channel if the tune-away will occur, wherein the CQI report indicates a lower CQI for the second channel than a current CQI for the second channel. Although shown at the Controller/Processor, other components of the UE 120a and BS 110a may be used performing the operations described herein.

Example CQI-Based Downlink Buffer Management

In certain cases, two different subscriptions may be supported on a same device, such as a user equipment, and are based on two separate subscriber identification module (SIMs), known as multi-SIM (MSIM). These subscriptions could be on the same radio network or different radio networks and could have different subscription profiles and Quality of Service (QOS) requirements. Further, different subscriptions may provide services on the same or different radio access technologies (RATs). Generally, MSIM solutions use less resources while performing operations on two different RATs than that needed by two independent solutions with the goal of optimizing resource (RF, MIPs, etc.) usage as well as providing enhanced user experience.

In some cases, different classes of radio frequency (RF) solutions exist for MSIM devices. For example, in some cases, the device may include a dual transceiver that may provide dual receive and dual access (DSDA). For example, in this case, each subscription may correspond to its own transceiver. In other cases, the device may include a single transceiver where two subscriptions share the same radio resources. Due to RF complexity, cost, and power consumption considerations, the majority of legacy Dual subscription devices and solutions share a single transceiver.

With 5G New Radio (NR) deployments aggressively moving ahead globally, MSIM solutions now comprise of a combination of 5G+4G/3G/2G RATs. There are two 5G solutions defined by Rel15 3GPP standards: non-standalone (NSA) and standalone 5G (SA). In the standalone 5G NR architecture, both signaling network and radio may be handled by 5G Core. In contrast, in 5G NSA networks, a long term evolution (LTE) core network and LTE radio access may be used as an anchor for all signaling and mobility management while adding a new 5G Carrier. This architecture is attractive for early deployments of 5G NR access systems as networks may reuse the legacy operational LTE eNodeB (eNB) and evolved packet core (EPC). Non-standalone solutions are also attractive as they facilitate a seamless migration from 4G to 5G for networks leveraging existing LTE core network.

Dual Connectivity (DC) has been introduced to allow a UE to simultaneously connect to two different network points for achieving higher throughput, reliability and mobility robustness. Evolved Universal Mobile Telecommunications Service Terrestrial Radio Access Network (EU-TRAN)-NR Dual Connectivity (ENDC) is one form of dual connectivity using LTE and NR. In ENDC mode and for a non-standalone implementation, the UE may be connected to an LTE eNB and to NR gNB. In certain cases, the LTE eNB may act as a master node (MeNB) while the gNB may act as a secondary node (SgNB). Both nodes may interface with the Evolved packet core (EPC) in the user plane but the master node may have direct connection to EPC.

Figure 3A:
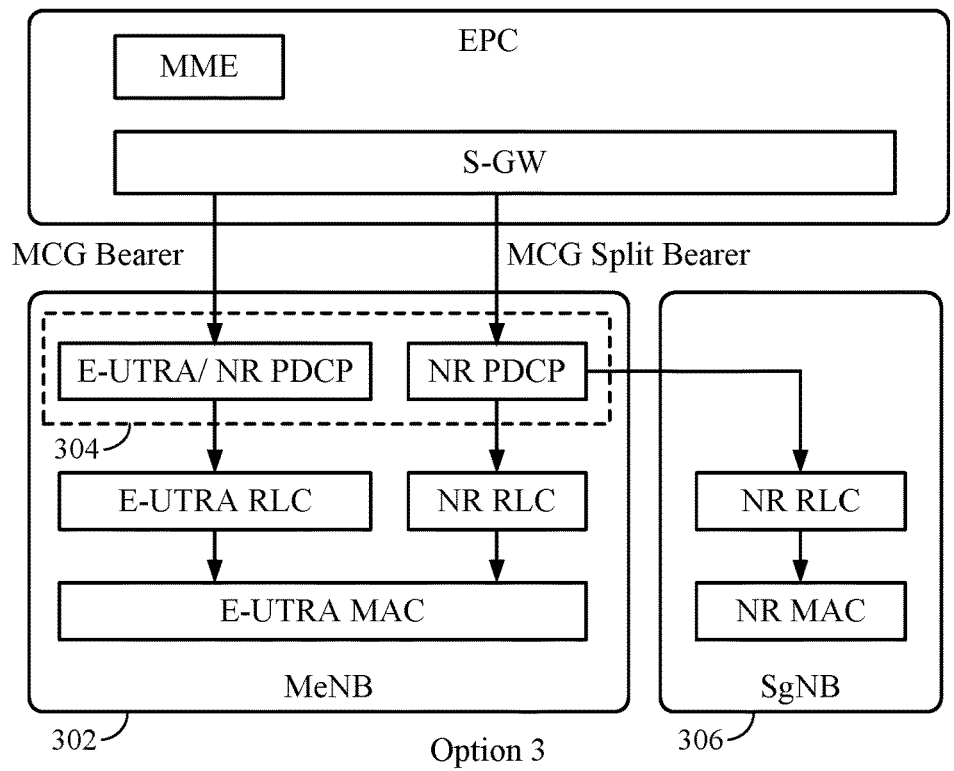
FIGS. 3A-3B illustrate different the split bearer configurations, in accordance with aspects of the present disclosure.
Figure 3B:
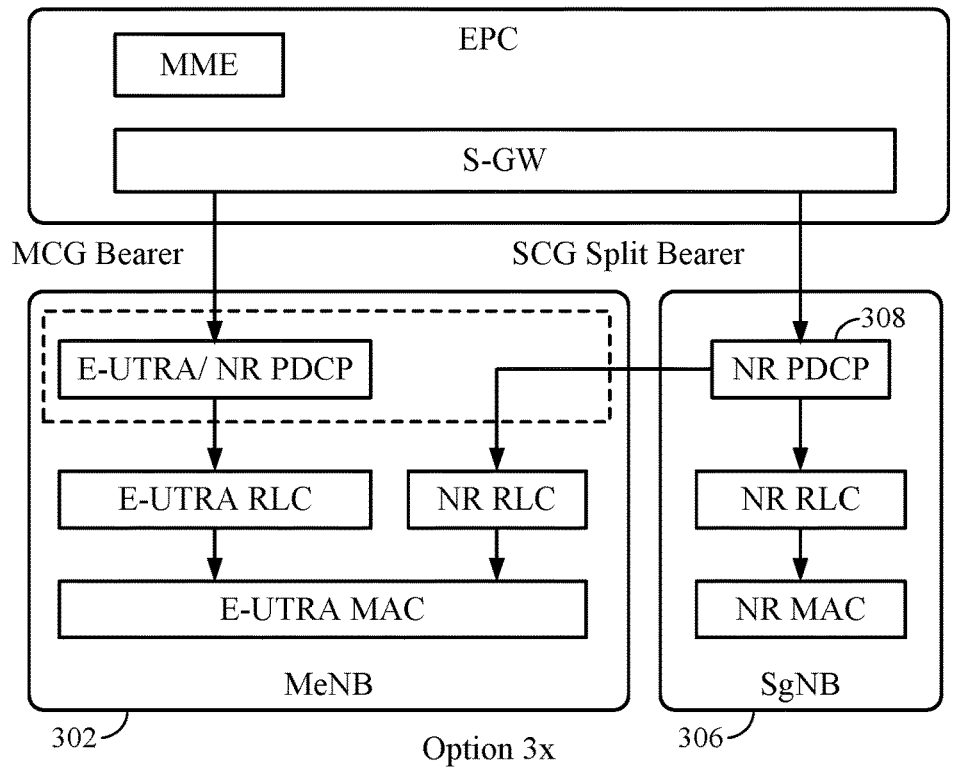

Multiple architecture options are available for dual connectivity depending on whether the system is standalone or non-standalone. In an example NSA configuration, a split bearer configuration may be used where user data is split at a packet data convergence protocol (PDCP) and routed to LTE or NR or both. In some cases, there may be two variants for the split bearer configuration: option 3 illustrated in FIG. 3A and option 3X illustrated in FIG. 3B. In option 3 of FIG. 3A, bearers may be terminated at MeNB 302 and user data traffic is split at the PDCP layer 304 of MeNB 302 and routed to LTE (e.g., to the MeNB 302) and NR (e.g., SgNB 306). In option 3X of FIG. 3B, bearers may be terminated at SgNB 306 and user data is split at PDCP layer 308 of SgNB 306 and routed to LTE (e.g., MeNB 302) and NR (e.g., SgNB 306). Both the options in split bearer may allow the network to leverage the bandwidth of LTE and NR to increase throughput capacity and reliability. The packet routing decision and data split ratio between LTE and 5G NR may be determined based on several factors such as channel conditions, traffic load balancing, buffer status, QOS requirements and backhaul capacity of the network.

Non-Standalone 5G MSIM can be configured as NSA+L/W/G and will be a new class of Concurrent RAT solutions rolled out by networks. Due to differences in RF Front end architecture, carrier frequency, MIMO requirements between 5G radio and 4G radio, NSA+L/W/G devices could have 1 transceiver for LTE+LTE/W/G and a separate transceiver for NR 5G Radio. Also, another possibility of concurrent RAT design is NR dual receive mode with some or all diversity chains tuned away due to RF co-existence restrictions or for second subscription radio.

In NSA+L/W/G (e.g., 4G/3G/2G) solutions with split bearer configuration (e.g., option 3 or 3X illustrated in FIGS. 3A and 3B, respectively), downlink data may be split between LTE and NR at the PDCP layer and radio link control (RLC) packets will be routed to NR and LTE separately, as illustrated. In NSA+L/W/G solutions, with a user equipment having one transceiver for NR and one transceiver for LTE+LTE/W/G, the user equipment may have to suspend a first technology using a first subscription (e.g., LTE) and tune away to allow a second subscription (e.g., L/W/G) to receive paging/perform measurement activity every discontinuous reception (DRX) cycle.

In such cases, the user equipment may continue to receive data via a second technology using the first subscription, such as 5G NR. Thus, the user equipment may encounter PDCP holes due to LTE tune away, while NR downlink packets during tune away are received in order (e.g., since the user equipment is tuned to L/W/G). These LTE PDCP holes may result in out-of-order delivery of packets at PDCP layer of user equipment during every tune away. Out-of-order data packets may be buffered in a PDCP reordering buffer in the user equipment to allow lower layer recovery of packets missed during the tune away. For example, when a PDCP packet is received out of order by the user equipment, the out-of-order packets may be buffered and a PDCP reordering timer may be started. The user equipment may then attempt to recover PDCP packets missed during the tune away, for example, via lower layer HARQ recovery or RLC recovery. Once the PDCP reordering timer expires or the PDCP reordering buffer is full, the buffered packets may be force-flushed to an application layer of the user equipment. In certain cases, the PDCP reordering buffer may ensure that there is minimal PDCP packet drop and that all packets (e.g., NR and LTE) are in order before sending them to application layer.

However, since the PDCP reordering buffer size is limited, the PDCP reordering buffer size presents an issue that can lead to LTE packets being dropped and unrecoverable when the UE tunes away to receive a page associated with the second subscription (e.g., L/W/G). For example, when the UE tunes away from LTE to monitor network activity associated with the second subscription, the UE may miss one or more LTE packets. When this occurs, the UE starts the PDCP reordering timer and attempts to receive the one or more missed LTE packets. However, due to the high throughput of 5G NR, 5G NR packets received using the first subscription may fill up the PDCP reordering buffer before the UE has a chance to receive the one or more missed LTE packets. In this case, when the PDCP reordering buffer is full, the UE must flush the packets in the PDCP reorder buffer to the application layer of the UE before the UE is able to receive the one or more missed LTE packets, leading to the one or more missed LTE packets being dropped and unrecoverable.

Figure 4:
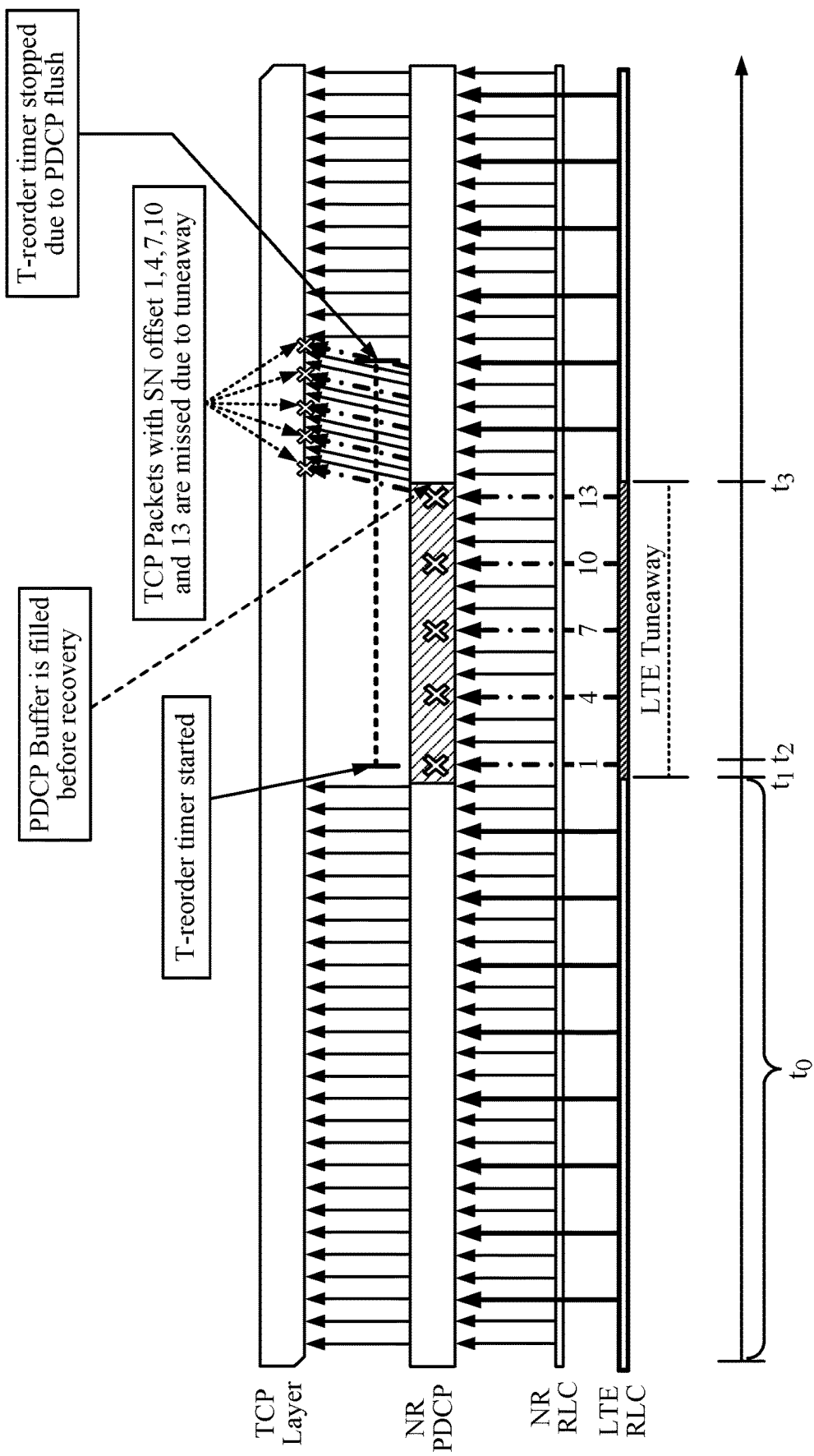
FIG. 4 provides an illustration of this packet drop issue due to the limited PDCP reordering buffer size, in accordance with certain aspects of the present disclosure.

FIG. 4 provides an illustration of this packet drop issue due to the limited PDCP reordering buffer size. For example, assume a PDCP reordering buffer size of 5 MB and that the 5G network is scheduling on every downlink slot of 0.5 ms with downlink modulation 27, 13 symbol and with 273 resource blocks (RBs) (e.g., for 100 MHz bandwidth). Based on current specifications, in this scenario, a transport block size may be greater than 129 KB per slot. Thus, under this example, the PDCP reordering buffer can store up to ~38 data packets (e.g., 5 MB/129 KB per packet).

In a 100 percent scheduling case, 38 NR packets may be scheduled in 19 ms as each packet can be scheduled in 1 slot (0.5 ms). Therefore, beyond 19 ms of tune away outage, the UE must flush packets with holes buffered in the PDCP reordering buffer to higher layers. For example, as illustrated in FIG. 4, at time t0 the UE may be receiving both LTE and NR DL packets before LTE tune away. At $t_1$, the UE performs a tune away from LTE to the second subscription (e.g., 4G, 3G, 2G) to receive paging or perform measurements. During tune away, LTE DL packets 1, 4, 7, 10, and 13 are missed as the LTE radio in NSA at the UE is suspended while NR packets continue to be received using the first subscription, resulting in five missing PDCP packets. At time $t_2$, the UE starts the PDCP reordering timer due to the missing PDCP packets and buffers any received out-of-order packets in PDCP reordering buffer. As noted above, the PDCP reordering timer is approximately 50-100 ms. However, the PDCP reordering buffer may not be able to accommodate more than 19 ms of NR data and will have to flush the out-of-order packets buffered in the PDCP reordering buffer well-before the PDCP reordering timer expires allowing no chance of lower layer HARQ recovery. For example, as illustrated at $t_3$, the PDCP reordering buffer may be filled due to NR data, resulting in the UE flushing the PDCP reordering buffer and dropping packets 1, 4, 7, 10 and 13. In addition, after the flush, a PDCP window may shift causing the missed packets to be unrecoverable.

Thus, in this scenario, holes (or lost packets) due to PDCP buffer flush impact a transmission control protocol (TCP) of the UE significantly. For example, in such cases, TCP flow control and back-off may be triggered due to the lost packets at every tune away, resulting in throughput being severely impacted. Accordingly, since the PDCP Reorder buffer size may not easily be changed (e.g., without changing the physical hardware of a UE), aspects of the present disclosure provide techniques for reducing the number of packet drops during a tune-away, for example, by lowering a number of out-of-order packets (e.g., NR packets) that need to be buffered post tune-away. In some cases, these techniques may involve transmitting a "fake" channel quality indicator (CQI) report corresponding to an NR channel so that the number of NR packets received post-tune away is reduced and premature PDCP reordering buffer fill-up is avoided.

Figure 5:
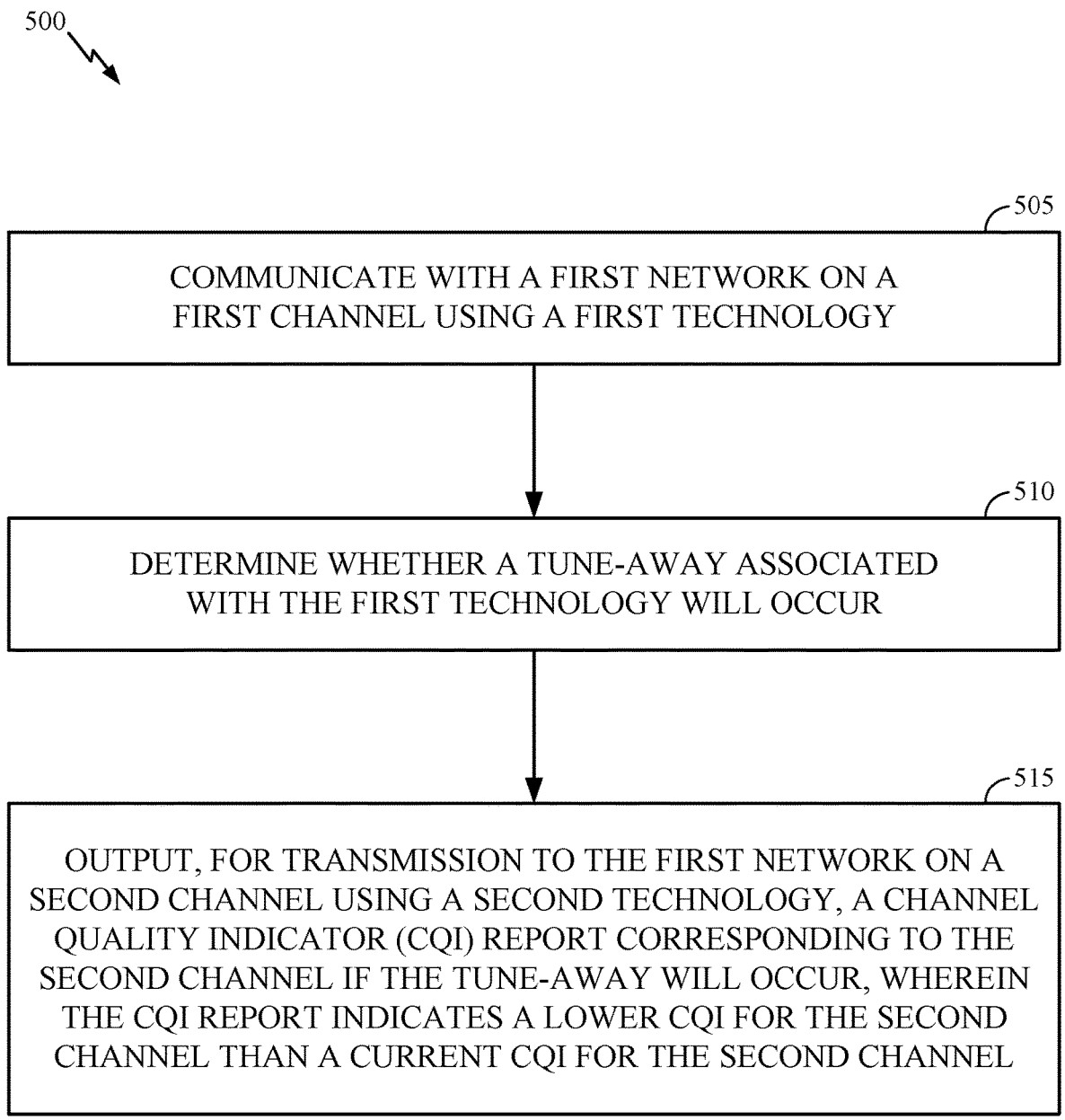
FIG. 5 is a flow diagram illustrating example operations for wireless communication by a UE, in accordance with certain aspects of the present disclosure.

FIG. 5 is a flow diagram illustrating example operations 500 for wireless communication, in accordance with certain aspects of the present disclosure. The operations 500 may be performed, for example, by UE (e.g., such as a UE 120a in the wireless communication network 100) for channel quality indicator (CQI)-based downlink buffer management as well as mitigating throughput loss in dual connectivity with multi-SIM, as described herein. Operations 400 may be implemented as software components that are executed and run on one or more processors (e.g., controller/processor 280 of FIG. 2). Further, the transmission and reception of signals by the UE in operations 400 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

The operations 500 begin, at 505, by communicating with a first network on a first channel using a first technology.

At 510, the UE determines whether a tune-away associated with the first technology will occur.

At 515, the UE outputs, for transmission to the first network on a second channel using a second technology, a channel quality indicator (CQI) report corresponding to the second channel if the tune-away will occur, wherein the CQI report indicates a lower CQI for the second channel than a current CQI for the second channel.

As noted above, aspects of the present disclosure provide techniques for reducing the number of packet drops during a tune-away, for example, by lowering the number of out-of-order packets that need to be buffered post tune-away.

For example, in some cases, aspects of the present disclosure provide techniques for CQI-based flow control whereby a UE transmits a "fake" lower CQI than a current CQI that actually exists to reduce the number of out-of-order packets that need to be buffered post tune-away. Reducing the number of out-of-order packets that are transmitted results in a size limit of the PDCP reorder buffer not being reached and allows the UE to recover any missed packets during tune-away.

For example, in certain cases, the UE may communicate with a first network using a first technology (e.g., LTE) on a first channel. In some cases, the UE may communicate using the first technology based on a first subscription stored in a first SIM. The UE may also be capable of communicating with the first network using a second technology (e.g., 5G) on a second channel, for example, using the first subscription stored in a first SIM. In some cases, the first technology (e.g., LTE) and the second technology (e.g., 5G) may be configured for split bearer communications by sharing a same packet data convergence protocol (PDCP), for example, using one of the configurations illustrated in FIG. 3A and FIG. 3B. Additionally, the UE may be capable of communicating with a second network using a third technology (e.g., 4G, 3G, and/or 2G) and a second subscription stored in a second SIM.

According to aspects, at some point in time, the UE may determine whether a tune-away associated with the first technology will occur. For example, in some cases, the UE may determine that a tune-away associated with the first technology will occur and that the UE needs to tune away from communicating with the first network using the first technology to communicate with a second network using the third technology (e.g., 4G, 3G, and/or 2G) on a third channel. As noted above, during the tune-away the UE may continue to communicate with the first network using the second technology (e.g., 5G NR). In some cases, the UE may determine the tune away based on scheduled measurements and/or a received page for the second subscription/third technology.

Accordingly, in response to the determination of whether a tune-away will occur (e.g., when the UE determines that a tune-away will occur), the UE may transmit a CQI report to the first network that indicates a lower CQI for the second channel corresponding to the second technology (e.g., 5G NR) than a current CQI that actually exists for the second channel. In some cases, transmitting the CQI report that indicates the lower CQI may be based on a determination of whether an application communicating using the second technology on the second channel is using a transmission control protocol and a non-standalone subscription. For example, in response to the tune-away and a determination that the application is using a transmission control protocol and a non-standalone subscription, the UE may proceed to determine the lower CQI.

In some cases, transmitting the CQI report that indicates a lower CQI may be based on a determination that a scheduled throughput associated with the second technology is above a threshold, resulting in a PDCP reordering buffer being filled up prematurely during the tune-away. For example, in some cases, in making this determination, the UE may monitor at least one of the current CQI associated with the second channel, a scheduling rate associated with the second technology, or a remaining packet reordering buffer size of the UE. Based on the monitoring, the UE may determine a scheduled throughput corresponding to the second technology based, at least in part, on at least one of the current CQI or the scheduling rate associated with the second technology. Additionally, in some cases, the UE may determine a duration corresponding to the tune-away.

Thereafter, the UE may determine whether the remaining packet reordering buffer size of the UE is sufficient to store one or more packets to be received from the first network using the second technology during the tune-away. For example, in some cases, the determination of whether the remaining packet reordering buffer size is sufficient may be based, at least in part, on at least one of the scheduled throughput corresponding to the second technology or a duration corresponding to the tune-away. For example, according to aspects, when the scheduled throughput corresponding to the second technology times the duration corresponding to the tune-away is less than the remaining packet reordering buffer size, the UE may determine that the remaining packet reordering buffer size is sufficient to store one or more packets received using the second technology during the tune-away.

However, when the scheduled throughput corresponding to second technology times the duration corresponding to the tune-away is greater than the remaining packet reordering buffer size, the UE may determine that the remaining packet reordering buffer size is not sufficient to store one or more packets received using the second technology during the tune-away. Accordingly, in this case, the UE determine the lower CQI based, at least in part, on the determination that the remaining packet reordering buffer size of the UE is not sufficient.

For example, when the UE determines that the remaining packet reordering buffer size of the UE is not sufficient to store one or more packets received from the first network using the second technology during the tune-away, the UE may determine the lower CQI such that the one or more packets received via the second technology during the tune-away do not exceed the remaining packet reordering buffer size of the UE. That is, for example, the UE may determine a CQI that will result in a transport block size reduction associated with the second technology such that the one or more packets received via the second technology during the tune-away do not exceed the remaining packet reordering buffer size of the UE. In some cases, the determination of the CQI may be based, at least in part, on at least one of the current CQI, the scheduling rate associated with the second technology, the remaining packet reordering buffer size of the UE, a tune-away time corresponding to the tune-away, the duration corresponding to the tune-away, or a periodicity corresponding to the tune-away.

For example, as illustrated in the table 600 shown in FIG. 6, each CQI index may correlate to a particular transport block size in bytes. For example, as illustrated in FIG. 6, a CQI index of 9 may correlate to a TBS of 69,677 bytes. Thus, the UE may be able to determine the scheduled throughput for any given CQI index. Accordingly, as the UE already knows the tune-away duration and the remaining packet reordering buffer size (e.g., as discussed above), the UE may determine a CQI that will result in a TBS reduction such that a size corresponding to the one or more packets received during the tune-away duration is less than the remaining packet reordering buffer size. For example, in some cases, the UE may determine the CQI according to: remaining packet reordering buffer size≥modified TBS related to the lower CQI*current scheduling rate*tune-away duration. In some cases, the UE may determine the lower CQI by using a look-up table, such as the table 600 illustrated FIG. 6. For example, in some cases, the UE may determine the modified TBS related to the lower CQI from the table 600 illustrated in FIG. 6.

Accordingly, once the UE determines the lower CQI resulting in an appropriate TBS reduction the UE may transmit, to the first network on the second channel using the second technology, a CQI report corresponding to the second channel indicates the lower CQI for the second channel. In some cases, the UE may output and transmit the CQI report to the first network (e.g., 5G gNB) on the second channel using the second technology before the tune-away occurs. In response to the lower CQI indicated in the CQI report, the first network may reduce a TBS size corresponding to the second technology, resulting in a reduced number of packets being transmitted using the second technology.

Thereafter, in some cases, the UE may perform the tune-away to communicate with the second network using the third technology and second subscription. In some cases, the third technology comprises one of a fourth generation (4G) technology, third generation (3G) technology, or second generation (2G) technology. According to aspects, during the tune-away, the UE may detect one or more missed packets associated with the first technology (e.g., LTE) while continuing to receive one or more packets using the second technology (e.g., 5G NR). In this case, based on the one or more missed packets, the UE may starting a PDCP reordering timer that provides the UE with a certain amount of time to recover these missed packets before the reordering buffer needs to be flushed. After starting the reordering timer, the UE may further receive one or more out-of-order packets from the first network using the second technology during the tune-away. The UE may then store the one or more out-of-order packets received from the first network using the second technology in the packet reordering buffer of the UE. According to aspects, since the UE reported the lower CQI, the one or more out-of-order packets received from the first network using the second technology may consequently and advantageously not exceed a size limit of the packet reordering buffer (e.g., the remaining packet reordering buffer size).

According to aspects, after the UE finishes performing the tune-away, the UE may return to communicating with the first network using the first technology. For example, in some cases, the UE may receive at least one packet from the first network using the first technology. In some cases, the at least one packet received using the first technology may comprise the one or more missed packets detected during the tune-away. Advantageously, since the UE reported the lower CQI, which, in turn, lowered the size of the one or more packets received from the first network using the second technology, the UE is able to receive the one or more missed packets before the reordering timer expires and before a size limit of the packet reordering buffer is exceeded. Accordingly, after receiving the one or more missed packets from the first network, the UE may re-order the one or more missed packets from the first network, and flush the re-ordered one or more missed packets received from the first network to an application layer of the UE.

Additionally, after the tune-away is complete, the UE may return to normal CQI operation, for example, by transmitting CQI reports for the second channel that reflect the current CQI corresponding to the second channel. Thereafter, upon detection of a next tune-away, the UE may repeat the techniques described above for reporting the lower CQI.

In addition to advantageously reducing the number of packet drops, techniques presented herein may also include additional benefits for dual receive architecture, for example, where 5G NR is in dual receive mode with some or all diversity chains tuned away. For example, in this case, the UE may demodulate 5G NR data with less number of receive chains during tune-away and, hence, lowering the CQI of 5G NR before tune-away increases the chance of decoding 5G NR data during tune-away. Since the UE may revert to normal CQI reporting post-tune-away, the UE may resume 5G NR demodulation with all receive chains after tune-away.

Figure 7:
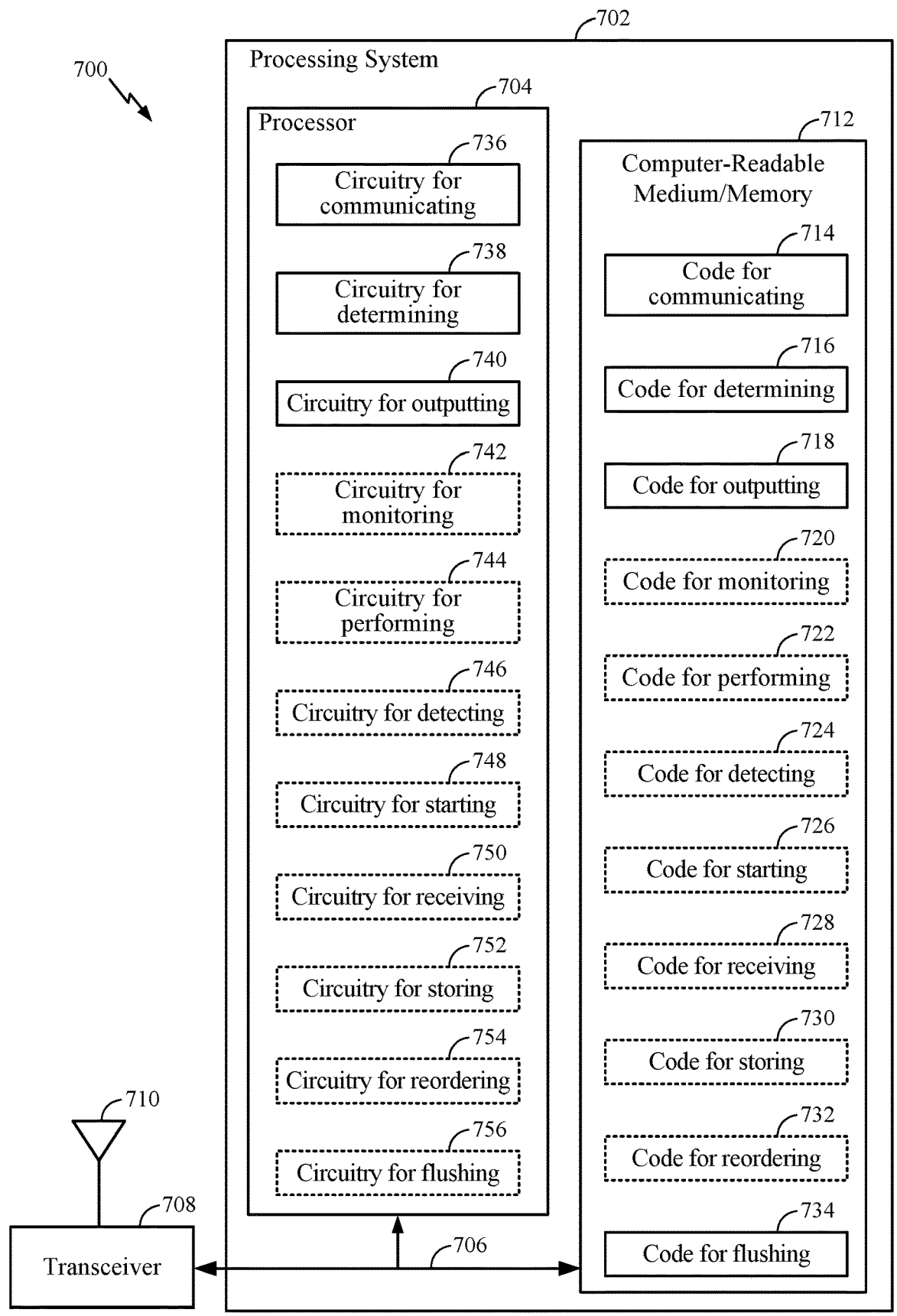
FIG. 7 illustrates a communications device that may include various components configured to perform operations for the techniques disclosed herein in accordance with aspects of the present disclosure.

FIG. 7 illustrates a communications device 700 that may include various components (e.g., corresponding to means-plus-function components) configured to perform operations for the techniques disclosed herein, such as the operations illustrated in FIG. 5. The communications device 700 includes a processing system 702 coupled to a transceiver 708. The transceiver 708 is configured to transmit and receive signals for the communications device 700 via an antenna 710, such as the various signals as described herein. The processing system 702 may be configured to perform processing functions for the communications device 700, including processing signals received and/or to be transmitted by the communications device 700.

The processing system 702 includes a processor 704 coupled to a computer-readable medium/memory 712 via a bus 706. In certain aspects, the computer-readable medium/memory 712 is configured to store instructions (e.g., computer-executable code) that when executed by the processor 704, cause the processor 704 to perform the operations illustrated in FIG. 5 and other operations for performing the various techniques discussed herein for channel quality indicator (CQI)-based downlink buffer management as well as mitigating throughput loss in dual connectivity with multi-SIM. In certain aspects, computer-readable medium/memory 712 stores code for performing the operations illustrated in FIG. 5 and other operations for performing the various techniques discussed herein for channel quality indicator (CQI)-based downlink buffer management as well as mitigating throughput loss in dual connectivity with multi-SIM. For example, computer-readable medium/memory 712 stores code 714 for communicating; code 716 for determining; code 718 for outputting; code 720 for monitoring; code 722 for performing; code 724 for detecting; code 726 for starting; code 728 for receiving; code 730 for storing; code 732 for reordering; and code 734 for flushing.

In certain aspects, the processor 704 may include circuitry configured to implement the code stored in the computer-readable medium/memory 712, such as for performing the operations illustrated in FIG. 5 and other operations for performing the various techniques discussed herein for channel quality indicator (CQI)-based downlink buffer management as well as mitigating throughput loss in dual connectivity with multi-SIM. For example, the processor 704 includes circuitry 736 for communicating; circuitry 738 for determining; circuitry 740 for outputting; circuitry 742 for monitoring; circuitry 744 for performing; circuitry 746 for detecting; circuitry 748 for starting; circuitry 750 for receiving; circuitry 752 for storing; circuitry 754 for reordering; and circuitry 756 for flushing.

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

The techniques described herein may be used for the wireless networks and radio technologies mentioned above as well as other wireless networks and radio technologies. For clarity, while aspects may be described herein using terminology commonly associated with 3G, 4G, and/or 5G wireless technologies, aspects of the present disclosure can be applied in other generation-based communication systems.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (e.g., 6 RBs), and there may be 1, 2, 4, 8, or 16 subbands for system bandwidth of 1.25, 2.5, 5, 10 or 20 MHz, respectively. In LTE, the basic transmission time interval (TTI) or packet duration is the 1 ms subframe.

NR may utilize OFDM with a CP on the uplink and downlink and include support for half-duplex operation using TDD. In NR, a subframe is still 1 ms, but the basic TTI is referred to as a slot. A subframe contains a variable number of slots (e.g., 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing. Beamforming may be supported and beam direction may be dynamically configured. MIMO transmissions with precoding may also be supported. In some examples, MIMO configurations in the DL may support up to 8 transmit antennas with multi-layer DL transmissions up to 8 streams and up to 2 streams per UE. In some examples, multi-layer transmissions with up to 2 streams per UE may be supported. Aggregation of multiple cells may be supported with up to 8 serving cells.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In some examples, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIG. 5 and other operations for performing the various techniques discussed herein for channel quality indicator (CQI)-based downlink buffer management as well as mitigating throughput loss in dual connectivity with multi-SIM.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. An apparatus for wireless communications by a user equipment (UE), comprising:
a processing system configured to:
communicate with a first network on a first channel using a first radio access technology; and
communicate on a second channel using a second radio access technology;
determine an occurrence of a tune-away associated with the first radio access technology; and
an interface configured to:
output, for transmission on the second channel using the second radio access technology, a channel quality indicator (CQI) report corresponding to the second channel based at least in part on the determination of the occurrence of the tune-away, wherein the CQI report indicates a lower CQI for the second channel than a CQI before the occurrence of the tune-away for the second channel.

2. The apparatus of claim 1, wherein the processing system is further configured to:
monitor at least one of the CQI before the occurrence of the tune-away, a scheduling rate associated with the second radio access technology, or a remaining packet reordering buffer size of the UE;
determine a scheduled throughput corresponding to the second radio access technology based, at least in part, on at least one of the CQI before the occurrence of the tune-away, the scheduling rate associated with the second radio access technology, or the remaining packet reordering buffer size of the UE;
determine whether the remaining packet reordering buffer size of the UE is sufficient to store one or more packets to be received from the first network using the second radio access technology during the tune-away based, at least in part, on at least one of the scheduled throughput corresponding to the second radio access technology or a duration corresponding to the tune-away; and
determine the lower CQI based, at least in part, on when the remaining packet reordering buffer size of the UE is not sufficient to store one or more packets received from the first network using the second radio access technology during the tune-away.

3. The apparatus of claim 2, wherein in order to determine the lower CQI the processing system is further configured to determine a CQI that will result in a transport block size reduction associated with the second radio access technology such that the one or more packets received via the second radio access technology during the tune-away do not exceed the remaining packet reordering buffer size of the UE.

4. The apparatus of claim 3, wherein the determination of the lower CQI is based, at least in part, on at least one of the CQI before the occurrence of the tune-away, the scheduling rate associated with the second radio access technology, the remaining packet reordering buffer size of the UE, a tune-away time corresponding to the tune-away, the duration corresponding to the tune-away, or a periodicity corresponding to the tune-away.

5. The apparatus of claim 1, wherein the determination of the lower CQI comprises using a look-up table.

6. The apparatus of claim 1, wherein the processing system is further configured to:
determine whether an application communicating using the second radio access technology on the second channel is using a transmission control protocol and a non-standalone subscription; and
determine the lower CQI when the application is using the transmission control protocol and the non-standalone subscription.

7. The apparatus of claim 1, wherein the processing system is further configured to perform the tune-away to communicate with a second network using a third radio access technology, wherein the third radio access technology comprises one of a fourth generation (4G) radio access technology, third generation (3G) radio access technology, or second generation (2G) radio access technology.

8. The apparatus of claim 7, wherein during the tune-away the processing system is further configured to:
detect one or more missed packets from the first network associated with the first radio access technology;
start a packet reordering timer in response to detecting the one or more missed packets;
receive one or more out-of-order packets from the first network using the second radio access technology during the tune-away; and
store the one or more out-of-order packets received from the first network using the second radio access technology in a packet reordering buffer of the UE.

9. The apparatus of claim 8, wherein the one or more out-of-order packets do not exceed a size limit of the packet reordering buffer.

10. The apparatus of claim 8, wherein the processing system is further configured to:
receive at least one packet from the first network using the first radio access technology before the tune-away timer expires and before a size limit of the packet reordering buffer is exceeded, wherein the at least one packet comprises the one or more missed packets;
re-order the at least one packet from the first network; and
flush the re-ordered at least one packet received from the first network to the application layer of the UE.

11. The apparatus of claim 1, wherein the interface is configured to output the CQI report for transmission to the first network on the second channel using the second radio access technology before the tune-away occurs.

12. The apparatus of claim 1, wherein the first radio access technology comprises a long term evolution (LTE)

radio access technology and the second radio access technology comprises a 5G new radio (NR) radio access technology.

13. The apparatus of claim 12, wherein the LTE radio access technology and the 5G NR radio access technology are configured for split bearer communications by sharing a same packet data convergence protocol (PDCP).

14. A method for wireless communications by a user equipment (UE), comprising:
communicating with a first network on a first channel using a first radio access technology;
communicate on a second channel using a second radio access technology;
determining an occurrence of a tune-away associated with the first radio access technology; and
outputting, for transmission on a second channel using a second radio access technology, a channel quality indicator (CQI) report corresponding to the second channel based at least in part on the determination of the occurrence of the tune-away, wherein the CQI report indicates a lower CQI for the second channel than a CQI before the occurrence of the tune-away for the second channel.

15. The method of claim 14, further comprising:
monitoring at least one of the CQI before the occurrence of the tune-away, a scheduling rate associated with the second radio access technology, or a remaining packet reordering buffer size of the UE;
determining a scheduled throughput corresponding to the second radio access technology based, at least in part, on at least one of the CQI before the occurrence of the tune-away, the scheduling rate associated with the second radio access technology, or the remaining packet reordering buffer size of the UE;
determining whether the remaining packet reordering buffer size of the UE is sufficient to store one or more packets to be received from the first network using the second radio access technology during the tune-away based, at least in part, on at least one of the scheduled throughput corresponding to the second radio access technology or a duration corresponding to the tune-away; and
determining the CQI before the occurrence of the tune-away based, at least in part, on when the remaining packet reordering buffer size of the UE is not sufficient to store one or more packets received from the first network using the second radio access technology during the tune-away.

16. The method of claim 15, wherein the determining the lower CQI comprises determining a CQI that will result in a transport block size reduction associated with the second radio access technology such that the one or more packets received via the second radio access technology during the tune-away do not exceed the remaining packet reordering buffer size of the UE.

17. The method of claim 16, wherein the determining the lower CQI is based, at least in part, on at least one of the CQI before the occurrence of the tune-away, the scheduling rate associated with the second radio access technology, the remaining packet reordering buffer size of the UE, a tune-away time corresponding to the tune-away, the duration corresponding to the tune-away, or a periodicity corresponding to the tune-away.

18. The method of claim 14, wherein determining the lower CQI comprises using a look-up table.

19. The method of claim 14, further comprising:
determining whether an application communicating using the second radio access technology on the second channel is using a transmission control protocol and a non-standalone subscription; and
determining the lower CQI when the application is using the transmission control protocol and the non-standalone subscription.

20. The method of claim 14, further comprising performing the tune-away to communicate with a second network using a third radio access technology, wherein the third radio access technology comprises one of a fourth generation (4G) radio access technology, third generation (3G) radio access technology, or second generation (2G) radio access technology.

21. The method of claim 20, wherein performing the tune-away comprises:
detecting one or more missed packets from the first network associated with the first radio access technology;
starting a packet reordering timer in response to detecting the one or more missed packets;
receiving one or more out-of-order packets from the first network using the second radio access technology during the tune-away; and
storing the one or more out-of-order packets received from the first network using the second radio access technology in a packet reordering buffer of the UE.

22. The method of claim 21, wherein the one or more out-of-order packets do not exceed a size limit of the packet reordering buffer.

23. The method of claim 21, further comprising:
receiving at least one packet from the first network using the first radio access technology before the tune-away timer expires and before a size limit of the packet reordering buffer is exceeded, wherein the at least one packet comprises the one or more missed packets;
reordering the at least one packet from the first network; and
flushing the re-ordered at least one packet received from the first network to the application layer of the UE.

24. The method of claim 14, wherein the interface is configured to output the CQI report for transmission to the first network on the second channel using the second radio access technology before the tune-away occurs.

25. The method of claim 14, wherein the first radio access technology comprises a long term evolution (LTE) radio access technology and the second radio access technology comprises a 5G new radio (NR) radio access technology.

26. The method of claim 25, wherein the LTE radio access technology and the 5G radio access technology are configured for split bearer communications by sharing a same packet data convergence protocol (PDCP).

27. An apparatus for wireless communications by a user equipment (UE), comprising:
means for communicating with a first network on a first channel using a first radio access technology;
means for communicating on a second channel using a second radio access technology;
means for determining an occurrence of a tune-away associated with the first radio access technology; and
means for outputting, for transmission on the second channel using the second radio access technology, a channel quality indicator (CQI) report corresponding to the second channel based at least in part on the determination of the occurrence of the tune-away, wherein the CQI report indicates a lower CQI for the second channel than a CQI before the occurrence of the tune-away for the second channel.

28. The apparatus of claim 27, wherein the first radio access technology comprises a long term evolution (LTE) radio access technology and the second radio access technology comprises a 5G new radio (NR) radio access technology.

29. A non-transitory computer-readable medium for wireless communications, comprising instructions executable by an apparatus to:
   communicate with a first network on a first channel using a first technology;
   communicate on a second channel using a second radio access technology;
   determine an occurrence of a tune-away associated with the first radio access technology; and
   output, for transmission on the second channel using the second radio access technology, a channel quality indicator (CQI) report corresponding to the second channel based at least in part on the determination of the occurrence of the tune-away, wherein the CQI report indicates a lower CQI for the second channel than a CQI before the occurrence of the tune-away for the second channel.

30. The non-transitory computer-readable medium of claim 29, wherein the first radio access technology comprises a long term evolution (LTE) radio access technology and the second radio access technology comprises a 5G new radio (NR) radio access technology.

* * * * *